United States Patent [19]

Randall

[11] Patent Number: 4,714,241
[45] Date of Patent: Dec. 22, 1987

[54] RECIRCULATING DOCUMENT FEEDER

[75] Inventor: Kent A. Randall, Rochester, N.Y.

[73] Assignee: Eastman Kodak Company, Rochester, N.Y.

[21] Appl. No.: 892,563

[22] Filed: Aug. 4, 1986

[51] Int. Cl.⁴ .............................................. B65H 39/10
[52] U.S. Cl. ...................................... 271/3.1; 271/186; 271/291; 271/301; 271/907
[58] Field of Search ................ 271/291, 301, 186, 3.1, 271/902

[56] References Cited

U.S. PATENT DOCUMENTS

| | | | |
|---|---|---|---|
| 4,192,607 | 3/1980 | Hage | 271/291 X |
| 4,223,886 | 9/1980 | Vogt | 271/902 X |
| 4,278,344 | 7/1981 | Sahay | 271/3.1 X |
| 4,319,833 | 3/1982 | Hidding . | |
| 4,359,217 | 11/1982 | Roller | 271/186 |
| 4,456,237 | 6/1984 | Buddendeck . | |
| 4,459,013 | 7/1984 | Hamlin . | |
| 4,469,319 | 9/1984 | Robb | 271/3.1 |

Primary Examiner—Richard A. Schacher
Attorney, Agent, or Firm—Lawrence P. Kessler

[57] ABSTRACT

A document feeder for recirculating simplex or duplex document sheets to and from a scanning station of a reproduction apparatus for selectively producing pre-collated or post-collated simplex or duplex copies of simplex or duplex document sheets. The document feeder includes a first document sheet transport path extending from a hopper to the scanning station; a second transport path located in juxtaposition with the scanning station for moving a document in scanning relation to such station; a third transport path, for turning a document sheet over, located between the hopper and the second transport path; and a fourth transport path extending between the second path and the hopper. A drive mechanism, associated with the transport paths, is operative to transport a sheet in a particular direction along such respective paths. A first diverter is controlled to be located in a first position for directing a transported document sheet from the first path to the third path when document sheets are of the simplex type, and in a second position for directing a transported document sheet from the first path to the second path when document sheets are of the duplex type. A second diverter is controlled to be located in a first position for retaining a transported document in the second path for recirculation past the scanning station when post-collated copies are to be made, and in a second position for directing a transported document sheet from the second path to the fourth path when pre-collated copies are to be made.

1 Claim, 15 Drawing Figures

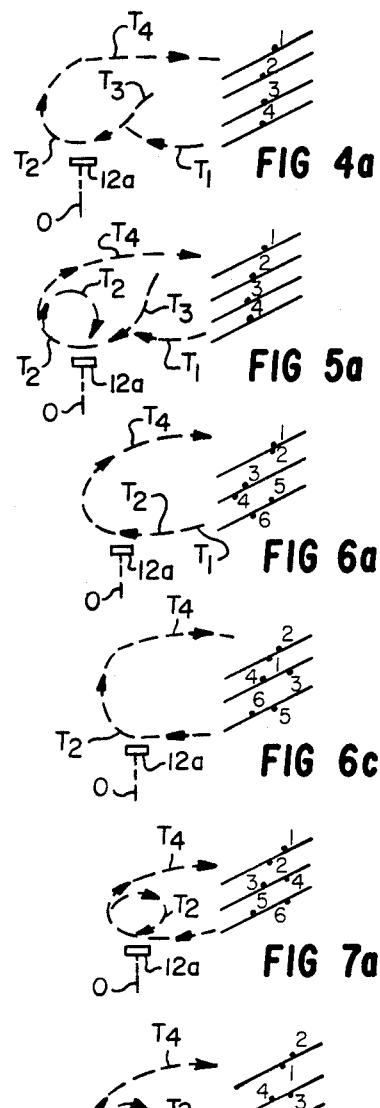
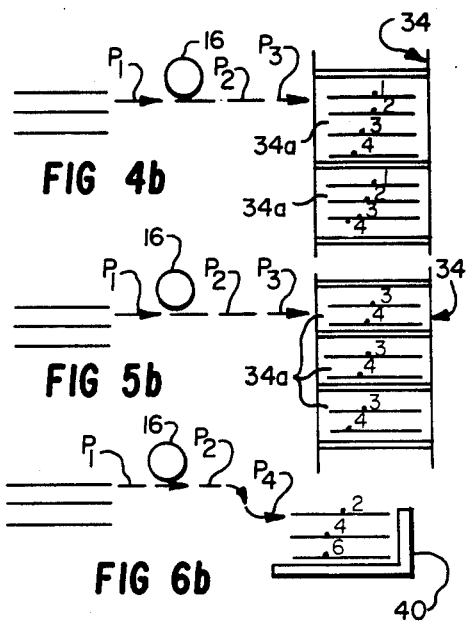
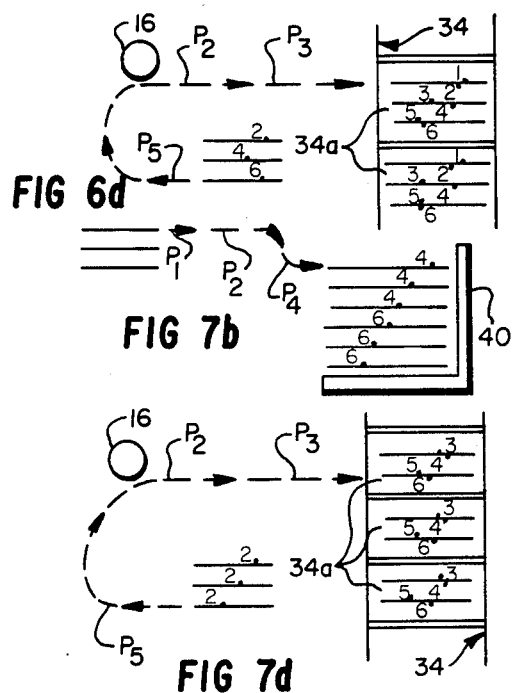
FIG 4a
FIG 5a
FIG 6a
FIG 6c
FIG 7a
FIG 7c
FIG 4b
FIG 5b
FIG 6b
FIG 6d
FIG 7b
FIG 7d

RECIRCULATING DOCUMENT FEEDER

BACKGROUND OF THE INVENTION

This invention relates generally to recirculating document feeders, and more particularly to a recirculating document feeder for use with an electrophotographic apparatus for producing pre-collated or post-collated simplex or duplex copies from simplex or duplex original documents.

Electrographic reproduction apparatus typically produce copies of original information on receiver members, such as cut sheets of plain bond paper for example. Such information copies may be formed on one side of the paper sheets (referred to as simplex copies), or on both sides of such sheets (referred to as duplex copies). In certain commercial reproduction apparatus capable of producing duplex copies, selected information is electrographically reproduced sequentially on the first sides of sheets which are thereafter collected in an intermediate tray. Such sheets are then sequentially transported from the intermediate tray back through the apparatus to have selected information respectively reproduced electrographically on the second sides of such sheets. This reproduction procedure is generally referred to as "two-pass" copying.

In a reproduction apparatus capable of making simplex copies or "two-pass" duplex copies from simplex or duplex document sheets, such apparatus typically requires a complex document sheet feeder, such as shown for example in U.S. Pat. No. 4,229,101, issued Oct. 21, 1980, in the name of Hamlin et al. The complexity of the feeder arises from the fact that in reproducing information from a multi-sheet document, handling of the document sheets requires complex logic in that all sheets bearing even side information must be reproduced and collected before all sheets bearing odd side information are reproduced (or vice-versa). Moreover, when the multi-sheet document is of the duplex variety, the sheets must at some time be turned over to enable reproduction of information on both sides thereof.

SUMMARY OF THE INVENTION

This invention is directed to a document feeder for recirculating simplex or duplex document sheets to and from a scanning station of a reproduction apparatus for selectively producing pre-collated or post-collated simplex or duplex copies of simplex or duplex document sheets. The document feeder includes a first document sheet transport path extending from a hopper to the scanning station; a second transport path located in juxtaposition with the scanning station for moving a document in scanning relation to such station; a third transport path, for turning a document sheet over, located between the hopper and the second transport path; and a fourth transport path extending between the second path and the hopper. A drive mechanism, associated with the transport paths, is operative to transport a sheet in a particular direction along such respective paths. A first diverter is controlled to be located in a first position for directing a transported document sheet from the first path to the third path when document sheets are of the simplex type, and in a second position for directing a transported document sheet from the first path to the second path when document sheets are of the duplex type. A second diverter is controlled to be located in a first position for retaining a transported document in the second path for recirculation past the scanning station when post-collated copies are to be made, and in a second position for directing a transported document sheet from the second path to the fourth path when pre-collated copies are to be made.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 4a is a schematic view depicting the travel path for simplex document sheets being fed by the recirculating document feeder of FIG. 2 for producing pre-collated simplex copies;

FIG. 4b is a schematic view depicting the travel path of receiver sheets utilized in the production of pre-collated simplex copies;

FIG. 5a is a schematic view depicting the travel path for simplex document sheets being fed by the recirculating document feeder of FIG. 2 for producing post-collated simplex copies;

FIG. 5b is a schematic view depicting the travel path of receiver sheets utilized in the production of post-collated simplex copies;

FIG. 6a and 6c are schematic views depicting the respective travel paths for opposite sides of duplex document sheets being fed by the recirculating document feeder of FIG. 2 for producing pre-collated duplex copies;

FIG. 6b is a schematic view depicting the travel path of receiver sheets utilized in the production of a first side of pre-collated duplex copies;

FIG. 6d is a schematic view depicting the travel path of receiver sheets utilized in the production of completed pre-collated duplex copies;

FIG. 7a and 7c are schematic views depicting the respective travel paths for opposite sides of duplex document sheets being fed by the recirculating document feeder of FIG. 2 for producing post-collated duplex copies;

FIG. 7b is a schematic view depicting the travel path of receiver sheets utilized in the production of a first side of post-collated duplex copies; and FIG. 7d is a schematic view depicting the travel path of receiver sheets utilized in the production of completed post-collated duplex copies.

DESCRIPTION OF THE PREFERRED EMBODIMENTS

Figure 1:
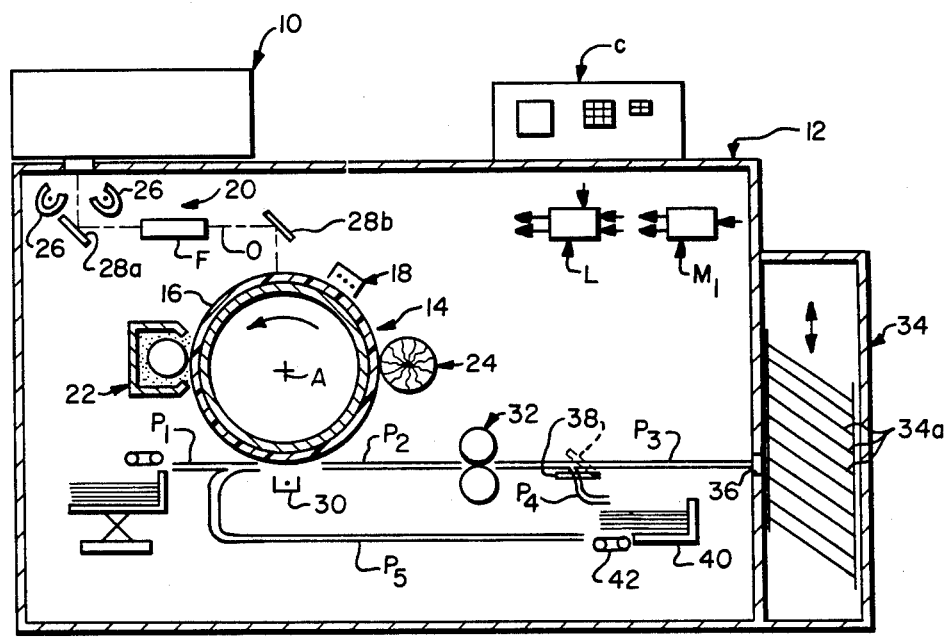
FIG. 1 is a schematic view of an exemplary reproduction apparatus associated with the recirculating document feeder according to this invention.

Referring now to the accompanying drawings, FIG. 1 shows a recirculating document feeder, according to this invention, generally designated by the numeral 10, in association with an exemplary reproduction apparatus generally designated by the numeral 12. The reproduction apparatus 12 includes a member 14, associated with electrographic process stations, upon which marking particle developed, transferable images of original information are formed by the operation of such process stations. The member 14 is, for example, a drum 16 mounted in the apparatus 12 for rotation in a counter-clockwise direction about its longitudinal axis A. The peripheral surface of the drum 16 has a composite construction including a photoconductive layer and a grounded support layer, such as shown in U.S. Pat. No. 3,615,414 (issued Oct. 26, 1971, in the name of Light) for example. Of course, the member 14 could alternatively comprise a closed loop web formed of similar composite construction. The electrographic process stations include a charging apparatus 18, an exposure mechanism 20, a developer apparatus 22, and a cleaning mechanism 24.

Under the control of a logic and control unit L, a motor $M_1$ rotates the drum 16 through operative relation with the electrographic process stations. The unit L includes, for example, a microprocessor receiving operator input signals and timing signals based on the angular position of the drum 16 about its axis A. Based on such signals and a program for the microprocessor, the unit L produces signals to control the rotation of the drum 16 and the operation of the various electrographic process stations for carrying out the reproduction process. The production of a program for a number of commercially available microprocessors such as INTEL model 8080 or model 8085 microprocessor (which along with others are suitable for use with the invention), is a conventional skill well understood in the art. The particular details of any such program would, of course, depend on the architecture of the designated microprocessor.

In the particular operation of the apparatus 12, the motor $M_1$ rotates the drum 16 in a counter-clockwise direction to move a portion of the photoconductive layer of its peripheral surface past the charging apparatus 18. The charging apparatus is, for example, a corona charger electrically coupled to a potential source (not shown). The charging apparatus 18 deposits a uniform electrostatic charge on such portion of the drum surface, and such portion then moves past an optical path O defined by the exposure mechanism 20. The mechanism 20 includes, lamps 26 which illuminate a document handled by the feeder 10 in the manner to be explained hereinbelow. A reflected light image of such document is projected along the optical path O in successive line segments via mirror 28a, through a fiber optic lens F, and mirrors 28b, 28c for example, onto the photoconductive layer of the peripheral surface of the rotating drum 16. Accordingly, such line segments of the reflected light image of the document expose the photoconductive layer and alter the uniform charge pattern thereon to form a charge pattern corresponding to such image.

After the image-wise charge pattern is formed on the photoconductive layer, the portion of the surface of the drum 16 bearing such pattern is moved into operative relation with the developer apparatus 22. The developer apparatus 22, which may be, for example, a magnetic brush developer of the type described in U.S. Pat. No. 3,457,900 (issued July 29, 1969 in the name of Drexler), brings pigmented marking particles into contact with the photoconductive layer. Such particles adhere to the charge pattern on such layer to develop the pattern into a transferable image. The transferable image is transferred to a receiver sheet, transported along a path $P_1$, by an electrostatic transfer field produced for example by a charger 30 coupled to a potential source (not shown). After transfer, the portion of the photoconductive layer from which such image was removed is cleaned of any residual marking particles by cleaning mechanism 24 (a rotating fur brush for example) and returned to a location relative to the charging apparatus 18 for reuse. Simultaneously, the receiver member bearing the transferred image is transported along a path $P_2$ through a fusing mechanism 32 where the image is fixed thereto by head and/or pressure for example. After the image is fixed to the receiver sheet, the sheet is transported along path $P_3$ to an output device 34 for operator retrieval. The output device 34 is, for example, a sorter having a plurality of vertically movable bins 34a. The movement of the bins 34a is selectively controlled by the unit L, in the manner to be explained more fully hereinbelow, to respectively position the bins relative to an exit slot 36 in the wall of the reproduction apparatus 12 in order to collect receiver sheets from path $P_3$. Of course, other output devices, such as fixed bin sorters for example, are suitable for use with this invention.

The reproduction apparatus 12 is arranged to also enable duplex copies to be made. In making duplex copies, receiver sheets bearing a fixed image on one side are diverted from path $P_3$ into path $P_4$ for collection in an intermediate tray 40. Diversion of such sheets is accomplished for example by a diverter 38 pivotable to position (phantom line of FIG. 1) to intercept path $P_3$. The receiver sheets collected in tray 40 are fed seriatem from the bottom of the collected stack by a feeder 42 into path $P_5$ and transported along such path back to the transfer charger 30. The path $P_5$ serves to turn the receiver sheets over so that images are respectively received on the opposite side of such sheets from the previously fixed image to form the duplex copy.

The recirculating document feeder 10 according to this invention is configured to enable simplex or duplex reproduction of simplex or duplex document sheets. Moreover, reproduction may be accomplished in a pre-collated mode or a post-collated mode. By pre-collated, it is meant that the reproduction of a multi-sheet document occurs in a sequence where copy-bearing receiver sheets are received at the output device 34 in page sequential order. By post-collated, it is meant that the reproduction of a multi-sheet document occurs in a sequence where copy-bearing receiver sheets of all of a particular page are received at the output device 34 before copy-bearing receiver sheets of a subsequent page are received at the output device.

Figure 2:
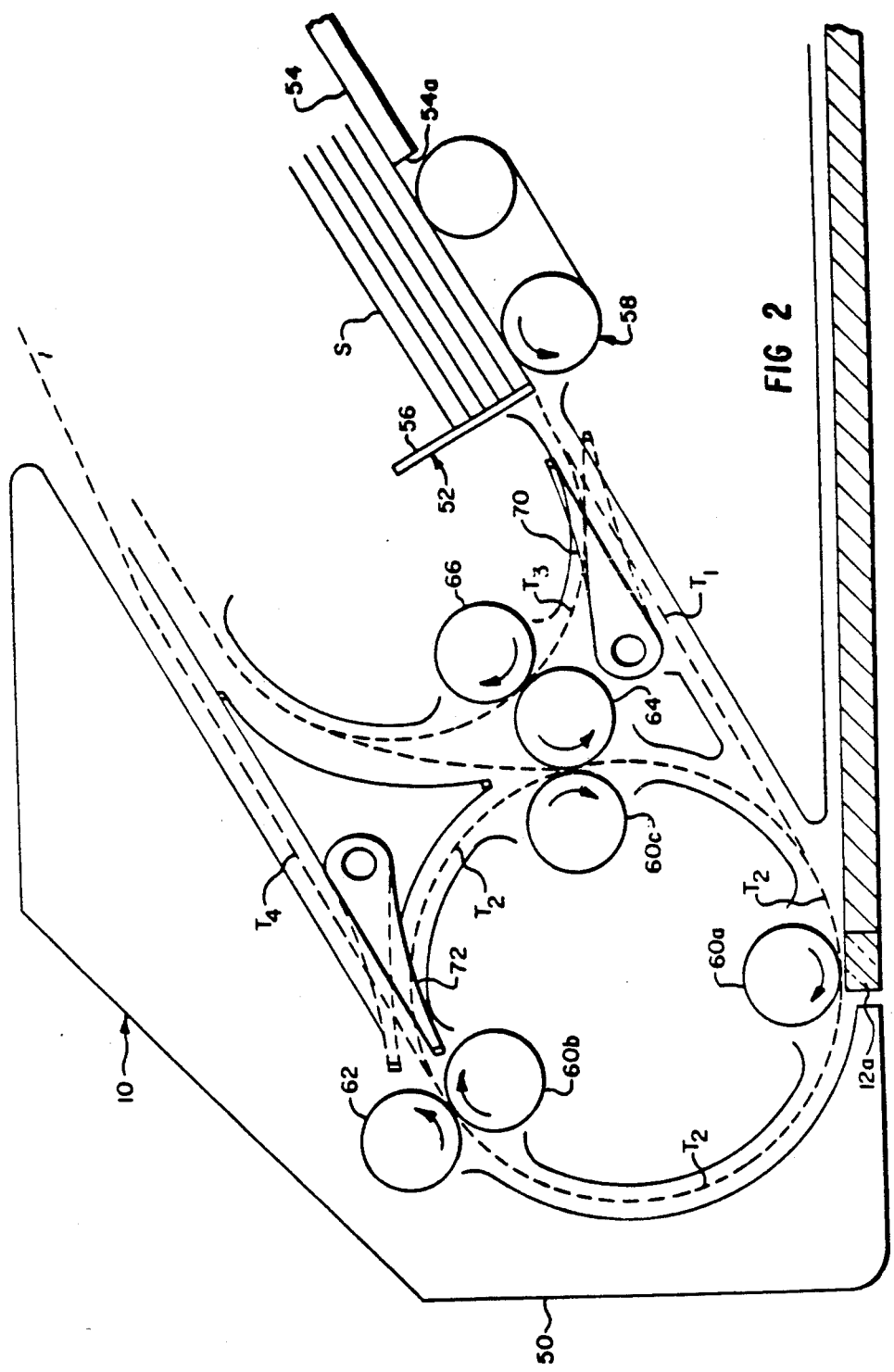
FIG. 2 is a side elevational view, partly in cross-section of the recirculating document feeder according to the invention with portions removed to facilitate viewing.

As best shown in FIG. 2, the feeder 10 includes a housing 50 located adjacent to the top wall of the reproduction apparatus 12 so that it overlies a transparent platen 12a of such apparatus. A tray 52 is supported in the housing 50. The tray 52 includes a base plate 54 located at an angle to horizontal and has an upstanding wall 56 substantially perpendicular to the base plate. The base plate 54 is adapted to hold a stack S of document sheets to be copied in a manner whereby such sheets are urged by gravity into engagement with the wall 56 to assure precise location of the lead edge of the sheets. A feed mechanism 58, such as a rotatable scuff belt driven by motor $M_2$ (see FIG. 3) for example, communicates with the bottom sheet in the stack through an opening 54a in the base plate 54 adjacent to the wall 56.

A first document sheet transport path $T_1$, defined by wire-form guides for example, extends from the tray 52 adjacent to the feed mechanism 58 toward the transparent platen 12a. The transparent platen is located relative to the exposure mechanism 20 to establish an image plane intersecting the optical axis O. A second transport path $T_2$, located in juxtaposition with the transparent platen 12a, is defined for example by wire-form guides and a plurality of rollers 60a, 60b, 60c. The rollers 60a, 60b and 60c are in nip relation with the transparent platen, roller 62 and roller 64 respectively, and are driven by motor $M_2$ in the manner to be explained hereinbelow with reference to FIG. 3 to transport a document sheet about path $T_2$. A third document sheet transport path $T_3$ is located between the tray 52 and the second transport path $T_2$. The path $T_3$ is, defined by wire-form guides for example, and includes a roller 66 located in nip relation with roller 64 and driven by motor $M_2$. The rollers 66, 64, and 60c therefore cooperate to form a three roller cluster in path $T_3$ which serves to turn over a document sheet. That is, a document sheet in path $T_3$ is transported in a first direction by rollers 64 and 66 until its trail edge clears the nip between such rollers. The shape of the path, the beam strength of the sheet, and gravity causes the trail edge to kick over into the nip between rollers 64 and 60c so that the sheet is transported from path $T_3$ into path $T_2$ with its trail edge becoming the lead edge and its surface orientation being opposite to that which existed when the sheet was in the tray 52. A fourth document sheet transport path $T_4$, defined by wire-form guides for example, extends from path $T_2$ to a point overlying tray 52.

The feeder 10 also includes a pair of diverters 70, 72. The diverters are selectively actuable, for example, by rotary solenoids (not shown) controlled by unit L, for movement to first (solid line) or second (phantom line) positions. The diverter 70 is located between transport path $T_1$ and transport path $T_3$. In its first position of FIG. 2, the diverter 70 directs a document sheet along path $T_1$ toward path $T_2$, while in its second position it directs a document sheet into path $T_3$. The diverter 72 is located between the transport path $T_2$ and transport path $T_4$. In its first position of FIG. 2, the diverter 72 directs a document sheet from path $T_2$ to path $T_4$, while in its second position it retains the document sheet in path $T_2$.

The recicirculating document feeder 10 according to this invention is capable of functioning under control of unit L in cooperation with the reproduction apparatus 12 in the follwoing modes: (1) recirculative feeding of simplex document sheets to produce pre-collated copies; (2) feeding simplex document sheets to produce post-collated copies; (3) recirculative feeding of duplex document sheets to produce pre-collated copies; and (4) feeding duplex document sheets to produce post-collated copies. The motor $M_2$ is coupled to the rollers 60a, 60b, 60c, 66 and feed mechanism 58 to drive the rollers and feed mechanism respectively in preselected directions for document sheet transport in one particular direction about the transport paths $T_1$ through $T_4$ irrespective of the mode of operation of the feeder 10. The respective modes of operation are then determined solely by the selective positioning of the diverters 70 and 72 as described hereinbelow.

Figure 3:
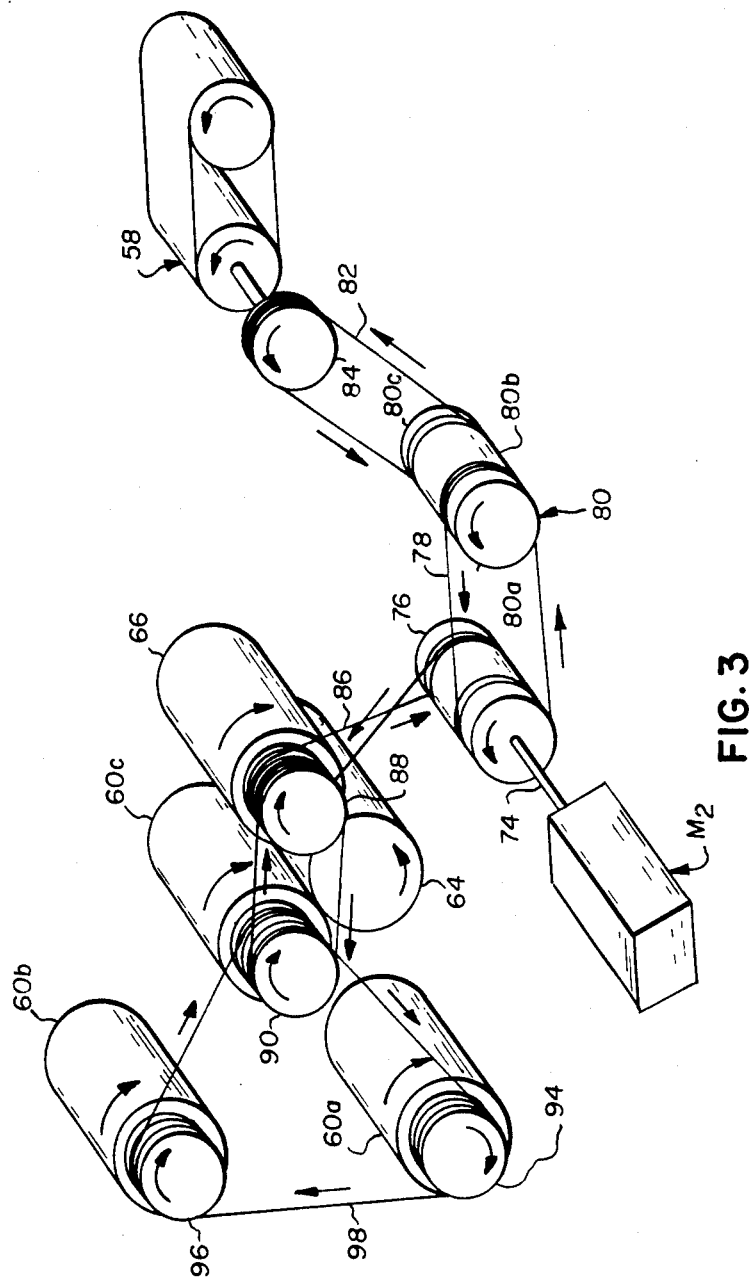
FIG. 3 is a schematic view of the drive mechanism for the recirculating document feeder of FIG. 2.

As best shown in FIG. 3, the output shaft 74 of motor $M_2$ is coupled to a main drive pulley 76 and rotates such pulley in a counter-clockwise direction. The main drive pulley 76 is coupled to the feed mechanism 58 by a drive belt 78, an intermediate pulley set 80, drive belt 82, and driven pulley 84. The intermediate pulley set 80 includes a first pulley 80a, a clutch 80b and a second pulley 80c. The clutch 80b is selectively activated by unit L to couple pulley 80a to pulley 80c to effect drive of the mechanism 58 only when it is desired to feed a document sheet from the tray 52. Additionally, the main drive pulley is coupled to the roller 66 by a drive belt 86 rotating a pulley 88, fixed to the support shaft of the roller 60, in a clockwise direction. In turn, the pulley 88 is coupled to a pulley 90 fixed to the support shaft of the roller 60c by a drive belt 92, and pulley 90 is coupled to pulleys 94 and 96 respectively fixed to the support shafts of rollers 60a and 60b by a drive belt 98. As such rollers 60a, 60b and 60c also rotate in a clockwise direction.

The operation of the recirculating document feeder 10 and the reproduction apparatus 12 in the mode for producing pre-collated copies of simplex document sheets is as follows: The simplex documents are placed in the tray 52 of the feeder 10 in page sequential order, image side face up. The operator then conditions the logic and control unit L for controlling the feeder 10 and reproduction apparatus 12 by activating appropriate buttons on the control panel C indicative of the desired mode of operation and the number of copies to be made, and thereafter activates the start button. The unit L turns on the Motor $M_1$ and $M_2$, and activates the output device 34 to position an appropriate bin 34a (e.g. top-most bin) adjacent to the exit slot 36. The diverter 70 is activated to move to its second (phantom line) position and diverter 72 is activated to move to its first (solid line) position. The remainder of the electrographic process stations are selectively activated by the unit L as the reproduction cycle is carried out in the above-described manner with the document sheets being transported seriatem by the feeder 10 across the platen 12a to intercept the optical path O of the exposure station 20 to enable copies of such document sheets to be sequentially reproduced. The document sheets are withdrawn from the tray 52 by activating the clutch 80b to couple pulleys 80a and 80c to effect drive of the feed mechanism 58 by the motor $M_2$ as described above with reference to FIG. 3.

The transport of simplex document sheets utilized to produce pre-collated copies is schematically shown in FIG. 4a, with receiver sheet transport being schematically shown in FIG. 4b. The document and receiver sheets bear the appropriate designations for their respective page numbers in association with the face of such sheets where original information or information copied exists. As can be readily appreciated when viewing FIG. 4a, the document sheets are: (1) removed seriatem from the bottom of the sheet stack and transported into path $T_1$; (2) diverted to path $T_3$ where they are turned over; (3) directed into path $T_2$ where their information sides are moved across the platen 12a to enable corresponding transferable images to be formed respectively on the drum 16; and (4) returned, in path $T_4$, to the top of the sheet stack, face up. Meanwhile, in synchronism with movement of the images on the drum, receiver sheets are transported along paths $P_1$, $P_2$ and $P_3$ to have copies of the document sheets respectively produced thereon, with such copy-bearing receiver sheets being stacked directly in page sequential order (i.e. pre-collated) in each bin 34a of the output device 34 (see FIG. 4b).

When the mode of operation for production of post-collated copies of simplex documents is selected by the operator, the unit L activates the diverter 72 to move it to its second position (phantom line) of FIG. 2 substantially as the lead edge of a document sheet (turned over in path T₃) on its first circulation about path T₂ enters the nip between rollers 60b and 62. As a result, such sheet is retained in path T₂ and is recirculated across the platen 12a for the number of times corresponding to the selected number of desired copies of such sheet (see FIG. 5a). Once the lead edge of the sheet has moved across the platen to enable the last of the selected number of copies to be made, the diverter 72 is activated to return to its first position to direct the document sheet from path T₂ to path T₄ for return to the top of the sheet stack. This cycle is repeated for each document sheet in the stack. By this described recirculation cycle, all of the selected number of copies of a particular document sheet are made prior to any copies being made of a subsequent document sheet. Therefore, receiver sheets bearing the reproduction of a particular document sheet are respectively delivered to separate bins 34a of the output device 34 (see FIG. 5b) sequentially moving relative to path P₃ as described above. Thereafter, receiver sheets respectively bearing the reproduction of subsequent document sheets are respectively similarly delivered to the separate bins so that after all the document sheets have been fed from and returned to the sheet stack, each bin of the output device 34 contains a reproduction of the document sheet stack in page sequential order.

FIGS. 6a through 6d schematically depict pre-collated reproduction of duplex document sheets. The duplex document sheets are placed in the tray 52 of the feeder 10 in page sequential order, first page (odd side) face up. The appropriate buttons on the control panel C are activated to condition the unit L to control the feeder 10 and reproduction apparatus 12 for this desired mode of operation and the desired number of copies to be made, and thereafter the start button is activated. The diverters 70 and 72 are moved to their respective first positions and diverter 38 is moved to its second position (phantom line position of FIG. 1). Accordingly, as shown in FIG. 6a, document sheets are: (1) removed seriatem from the bottom of the sheet stack and transported into path T₁; (2) moved along path T₂ across the platen 12a where the information on the even sides of the document sheets are exposed to enable corresponding transferable images to be respectively formed on the drum 16; and (3) returned, in path T₄ to the top of the sheet stack with the even sides face up. Document sheet transport is then repeated with the odd sides of the document sheets being presented to the exposure mechanism and the sheets returned to the stack with their even sides face up (see FIG. 6c). Such alternate presentation of even sides and then odd sides of the document sheets is repeated a number of times equal to the selected number of copies of the document stack to be made. Meanwhile, in synchronism with the movement of the transferable images of even sides of the document sheets on the drum, receiver sheets are transported, as shown in FIG. 6b, along paths P₁, P₂ and P₄ *l to have copies of the even sides of the document sheets produced thereon, with such copy-bearing receiver sheets being stacked in sequential order in the intermediate tray 40. After the receiver sheet bearing the copy of the last document sheet even side presented to the platen is fed to tray 40, the diverter 38 is moved to its first position (solid line position of FIG. 1). The receiver sheets are then transported seriatem along paths P₅, P₂ and P₃ as described above, in synchronism with the movement of the transferable images of the odd sides of the document sheets on the drum 16 (see FIG. 6d) to have copies of the odd sides produced thereon, with the* resultant duplex copy-bearing receiver sheets being stacked in a particular bin of the output device 34 directly in page sequential order (i.e. pre-collated). After the receiver sheet bearing the copy of the last odd side presented to the platen is fed to the output device 34, the diverter 38 is moved to its second position, and the receiver sheet transport cycles are alternately repeated the number of times required to produce the selected number of copies of the document stack, each stack copy being stacked in separate bins of the device 34.

Post-collated reproduction of duplex document sheets is schematically shown in FIGS. 7a through 7d. For post-collation, the document sheets are transported to and from the sheet stack (see Fig. 7a, 7c) in a manner similar to that shown and described with reference to FIGS. 6a and 6c. However, the diverter 72 is selectively moved to its second position to retain each document sheets in the transport path T₂ for recirculation relative to the platen 12a a number of times equal to the selected number of copies of the document sheet stack to be made, as described with reference to FIG. 5a. Further, the receiver sheets are transported to the intermediate tray 40 and thence to the output device 34 (see FIGS. 7b and 7d) in a manner similar to that shown and described with reference to FIGS. 6b and 6d. However, the intermediate tray 40 receives all of the even side copy-bearing receiver sheets prior to transport of such sheets to have odd side copies produced thereon. Further the output device 34 functions as shown and described with reference to FIG. 5b to deliver respective like duplex receiver sheets (e.g., receiver sheets containing page 6 on one side and page 5 on the opposite side) to separate bins 34a. After all the document sheets have been fed from and returned to the document sheet stack, each bin of the output device 34 contains a reproduction of the document sheet stack in page sequential order.

The invention has been described in detail with particular reference to a preferred embodiment thereof, but it will be understood that variations and modifications can be effected within the spirit and scope of the invention.

What is claimed is:

1. A document feeder for recirculating simplex or duplex document sheets to and from a scanning station of a reproduction apparatus for enabling selective production of pre-collated or post-collated simplex or duplex copies of simplex or duplex document sheets, said document feeder comprising:

means for holding a stack of document sheets;

means for defining a first document sheet transport path in which a document sheet is moved from said stack holding means to said scanning station;

means for defining a second document sheet transport path in which a document sheet is moved in relation to said scanning station for scanning such document;

means for defining a third document sheet transport path in which a document sheet is turned over;

means for defining a fourth document sheet transport path in which a document sheet is moved from said second path defining means to said stack holding means;

first diverter means selectively movable to a first position for directing a transported document sheet from said first path defining means to said third path defining means, or to a second position for directing a transported document sheet from said first path defining means to said second path defining means;

second diverter means selectively movable to a first position for retaining a transported document sheet in said second path defining means for recirculation past said scanning station, or to a second position for directing a transported document sheet from said second path defining means to said fourth path defining means; and control means for positioning said first diverter means in its second position when document sheets are of the simplex type and in its first position when document sheets are of the duplex type, and for positioning said second diverter means in its second position when copies are to be made for post-collation and in its first position when copies are to be made for pre-collation.

* * * * *